(12) United States Patent
Cowelchuk et al.

(10) Patent No.: US 7,156,437 B2
(45) Date of Patent: Jan. 2, 2007

(54) AUTOMOTIVE TRIM PART WITH APPLIQUE AND METHOD OF MAKING SAME

(75) Inventors: Glenn A Cowelchuk, Chesterfield Township, MI (US); Todd L DePue, Brighton, MI (US); David Dooley, Troy, MI (US); Michael J Hier, Milford, MI (US); Randy S Reed, Fair Haven, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/904,007

(22) Filed: Oct. 19, 2004

(65) Prior Publication Data

US 2006/0082173 A1 Apr. 20, 2006

(51) Int. Cl.
*B60R 13/02* (2006.01)
*B60R 13/04* (2006.01)
*B60R 21/04* (2006.01)

(52) U.S. Cl. .............................. 296/1.08; 296/187.05; 296/146.7; 296/39.1

(58) Field of Classification Search .............. 296/1.08, 296/1.09, 187.05, 146.7, 39.1, 191, 214, 296/187.02
See application file for complete search history.

(56) References Cited

U.S. PATENT DOCUMENTS

| | | |
|---|---|---|
| 3,400,979 A | 9/1968 | James et al. |
| 3,833,964 A | 9/1974 | Harcourt |
| 4,124,308 A | 11/1978 | Sokolow |
| 4,330,584 A | 5/1982 | Doerer |
| 4,470,936 A | 9/1984 | Potter |
| 4,766,025 A | 8/1988 | Sanok et al. |
| 4,781,956 A | 11/1988 | Zimmermann et al. |
| 4,783,114 A | 11/1988 | Welch |
| 4,810,452 A | 3/1989 | Taillefert et al. |
| 4,958,883 A | 9/1990 | Iwaki et al. |
| 5,002,307 A | 3/1991 | Heidorn |
| 5,040,335 A | 8/1991 | Grimes |
| 5,071,605 A | 12/1991 | Kawaguchi et al. |

(Continued)

FOREIGN PATENT DOCUMENTS

DE 1993429 2/2001

(Continued)

OTHER PUBLICATIONS

United Kingdom Patent Office, *Combined Search and Examination Report*, corresponding British Application No. GB0522230.2, Jan. 31, 2006.

(Continued)

*Primary Examiner*—D. Glenn Dayoan
*Assistant Examiner*—Greg Blankenship
(74) *Attorney, Agent, or Firm*—Wood, Herron & Evans, L.L.P.

(57) ABSTRACT

The present invention provides for an improved trim part, e.g. a bolster or trim plate, with integrated appliqué for use in a trim assembly, and to a continuous two-shot molding operation that may be performed utilizing a single mold assembly. In an exemplary embodiment, the trim part, i.e. a bolster, includes a substrate formed by injecting a first material into a first shot mold cavity in a first shot of a molding operation. An appliqué is provided in a second shot mold cavity then a cover is formed between the substrate and appliqué by injecting into a mold chamber a second foamed material in a second shot of the molding operation. The formed cover is integrally molded to at least a portion of the substrate and the appliqué to form a trim part with integrated appliqué.

5 Claims, 4 Drawing Sheets

U.S. PATENT DOCUMENTS

| | | | |
|---|---|---|---|
| 5,073,318 A | 12/1991 | Rohriach et al. |
| 5,096,221 A | 3/1992 | Combs et al. |
| 5,224,299 A | 7/1993 | Abe |
| 5,297,842 A | 3/1994 | Hayashi |
| 5,387,390 A | 2/1995 | Kornylo |
| 5,395,135 A | 3/1995 | Lim et al. |
| 5,407,225 A | 4/1995 | Cooper |
| 5,445,430 A | 8/1995 | Nichols |
| 5,484,561 A | 1/1996 | Weber et al. |
| 5,527,084 A | 6/1996 | Scherf |
| 5,536,351 A | 7/1996 | Rheinlander et al. |
| 5,571,597 A | 11/1996 | Gallagher et al. |
| 5,573,617 A | 11/1996 | Franck et al. |
| 5,590,901 A | 1/1997 | MacGregor |
| 5,626,382 A | 5/1997 | Johnson et al. |
| 5,663,210 A | 9/1997 | Sugimoto et al. |
| 5,679,296 A | 10/1997 | Kelman et al. |
| 5,692,711 A | 12/1997 | Tucker |
| 5,709,925 A | 1/1998 | Spengler et al. |
| 5,779,262 A | 7/1998 | Totani et al. |
| 5,783,293 A | 7/1998 | Lammi |
| 5,792,413 A | 8/1998 | Ang et al. |
| 5,799,385 A | 9/1998 | Vecchiarino et al. |
| 5,803,415 A | 9/1998 | Konishi et al. |
| 5,810,388 A | 9/1998 | Berardi et al. |
| 5,816,609 A | 10/1998 | Gray et al. |
| 5,871,253 A | 2/1999 | Erber |
| 5,904,370 A | 5/1999 | Steiner et al. |
| 5,932,331 A | 8/1999 | Jones et al. |
| 5,934,730 A | 8/1999 | Yagishita et al. |
| 5,941,557 A | 8/1999 | Mullins, Jr. |
| 5,951,094 A | 9/1999 | Konishi et al. |
| 5,976,289 A | 11/1999 | Kawakubo et al. |
| 5,995,380 A | 11/1999 | Maue et al. |
| 6,012,735 A | 1/2000 | Gray et al. |
| 6,013,210 A | 1/2000 | Gardner, Jr. |
| 6,017,617 A | 1/2000 | Gardner, Jr. |
| 6,070,905 A | 6/2000 | Renault |
| 6,116,672 A | 9/2000 | Cannon et al. |
| 6,136,415 A | 10/2000 | Spengler |
| 6,168,188 B1 | 1/2001 | Preisler et al. |
| 6,186,582 B1 | 2/2001 | Beckmann |
| 6,210,613 B1 | 4/2001 | Stein et al. |
| 6,214,157 B1 | 4/2001 | Sjpengler |
| 6,217,098 B1 | 4/2001 | O'Brien et al. |
| 6,248,200 B1 | 6/2001 | Dailey et al. |
| 6,251,326 B1 | 6/2001 | Siano et al. |
| 6,267,918 B1 | 7/2001 | Bauer |
| 6,308,488 B1 | 10/2001 | Hoshino |
| 6,319,438 B1 | 11/2001 | Smith et al. |
| 6,364,351 B1 | 4/2002 | Hier et al. |
| 6,368,093 B1 | 4/2002 | Vecchiarino et al. |
| 6,391,232 B1 | 5/2002 | Fritsch |
| 6,402,189 B1 | 6/2002 | Gray et al. |
| 6,409,947 B1 | 6/2002 | Wandyez |
| 6,431,600 B1 | 8/2002 | Freisler et al. |
| 6,433,728 B1 | 8/2002 | Krupp et al. |
| 6,447,047 B1 | 9/2002 | Marcovecchio et al. |
| 6,453,535 B1 | 9/2002 | Nicholas |
| 6,485,072 B1 | 11/2002 | Werner et al. |
| 6,517,144 B1 | 2/2003 | Kobayashi |
| 6,544,449 B1 | 4/2003 | Gardner |
| 6,554,350 B1 | 4/2003 | Takahara |
| 6,568,707 B1 | 5/2003 | Hier et al. |
| 6,627,134 B1 | 9/2003 | Thomson |
| 6,644,727 B1 | 11/2003 | Audibert et al. |
| 6,652,793 B1 | 11/2003 | Corrion et al. |
| 6,657,158 B1 | 12/2003 | Shelly et al. |
| 6,688,640 B1 | 2/2004 | Davis, Jr. et al. |
| 6,706,365 B1 | 3/2004 | Akasaka et al. |
| 6,708,462 B1 | 3/2004 | Pokorzynski et al. |
| 6,742,830 B1 | 6/2004 | Zimmerman et al. |
| 6,746,067 B1 | 6/2004 | Schmidt et al. |
| 6,749,794 B1 * | 6/2004 | Spengler .................... 264/458 |
| 6,756,004 B1 | 6/2004 | Davis, Jr. et al. |
| 6,764,621 B1 | 7/2004 | Schwaighofer |
| 6,764,633 B1 | 7/2004 | Takahashi et al. |
| 6,793,181 B1 | 9/2004 | Hallock |
| 6,821,465 B1 | 11/2004 | Stein et al. |
| 6,837,544 B1 | 1/2005 | Bornchen et al. |
| 6,899,363 B1 | 5/2005 | Dry |
| 6,899,373 B1 | 5/2005 | Kim |
| 6,929,309 B1 | 8/2005 | Radu et al. |
| 6,955,392 B1 | 10/2005 | Dry |
| 6,983,967 B1 | 1/2006 | Scheidmantal et al. |
| 6,991,841 B1 | 1/2006 | Cowelchuk et al. |
| 7,005,092 B1 | 2/2006 | Dooley et al. |
| 2001/0047899 A1 | 12/2001 | Ikeda |
| 2002/0041912 A1 | 4/2002 | Thomson |
| 2002/0043861 A1 | 4/2002 | Meadows |
| 2002/0066972 A1 * | 6/2002 | Fritsch ...................... 264/46.4 |
| 2002/0079603 A1 | 6/2002 | Bernis et al. |
| 2002/0153741 A1 | 10/2002 | Speelman et al. |
| 2003/0041955 A1 | 3/2003 | Spengler |
| 2003/0071039 A1 | 4/2003 | Spykerman et al. |
| 2003/0075833 A1 | 4/2003 | Thomson |
| 2003/0121877 A1 | 7/2003 | Brozell et al. |
| 2003/0184064 A1 | 10/2003 | Hier et al. |
| 2003/0209888 A1 | 11/2003 | Davis, Jr. et al. |
| 2003/0209890 A1 | 11/2003 | Totani et al. |
| 2003/0209892 A1 | 11/2003 | Hier et al. |
| 2004/0017023 A1 | 1/2004 | Cowelchuk et al. |
| 2004/0032055 A1 | 2/2004 | Cavallaro et al. |
| 2004/0119267 A1 | 6/2004 | Cowelchuck et al. |
| 2004/0119268 A1 | 6/2004 | Davis, Jr. et al. |
| 2004/0130051 A1 | 7/2004 | Cowelchuk et al. |
| 2004/0202824 A1 | 10/2004 | Hayashi et al. |
| 2005/0046075 A1 | 3/2005 | Youngs et al. |
| 2005/0183239 A1 | 8/2005 | Chen |
| 2005/0183897 A1 | 8/2005 | DePue |
| 2005/0186388 A1 | 8/2005 | Mekas et al. |
| 2005/0194806 A1 | 9/2005 | Cowelchuk et al. |
| 2005/0242619 A1 | 11/2005 | Schoemann et al. |
| 2005/0258569 A1 | 11/2005 | Schoemann et al. |
| 2006/0001291 A1 | 1/2006 | Dooley et al. |
| 2006/0029789 A1 | 2/2006 | Donatti et al. |

FOREIGN PATENT DOCUMENTS

| | | |
|---|---|---|
| DE | 19934249 A1 | 2/2001 |
| DE | 10104036 | 8/2001 |
| DE | 10123207 | 7/2002 |
| EP | 0408202 | 1/1991 |
| EP | 0410553 | 1/1991 |
| EP | 0749872 | 3/2000 |
| EP | 1086863 | 3/2001 |
| EP | 1182024 | 2/2002 |
| EP | 1580077 | 9/2005 |
| FR | 2771356 | 5/1999 |
| FR | 2796610 | 1/2001 |
| GB | 2403683 | 1/2005 |
| JP | 05237871 | 9/1993 |
| JP | 08011145 | 1/1996 |
| JP | 08026054 | 1/1996 |
| JP | 08183059 | 7/1996 |
| JP | 2000/016216 | 7/1998 |
| JP | 10291431 | 11/1998 |
| JP | 11070604 | 3/1999 |
| JP | 11123999 | 5/1999 |
| JP | 11291288 | 10/1999 |
| JP | 2003/103676 | 4/2003 |
| JP | 2003/266476 | 9/2003 |
| JP | 2005/119404 | 5/2005 |

| | | |
|---|---|---|
| WO | WO 01/25055 | 4/2001 |

OTHER PUBLICATIONS

United Kingdom Patent Office, *Combined Search and Examination Report,* corresponding British Application No. GB0522255.9, Jan. 3, 2006.

United Kingdom Patent Office, *Combined Search and Examination Report,* corresponding British Application No. GB0521011.7, Nov. 18, 2005.

United Kingdom Patent Office, *Combined Search and Examination Report,* corresponding British Application No. GB0521012.5, Nov. 21, 2005.

United Kingdom Patent Office, *Combined Search and Examination Report,* corresponding British Application No. GB0520991.1, Jan. 20, 2006.

UK Patent Office, *Combined Search and Examination Report,* corresponding U.K. Application No. GB0520995.2, Dec. 23, 2005.

UK Patent Office, *Combined Search and Examination Report,* corresponding U.K. Application No. 0520998.6, Dec. 23, 2005.

UK Patent Office, *Combined Search and Examination Report,* corresponding U.K. Application No. 0521000.0, Dec. 14, 2005.

UK Patent Office, *Combined Search and Examination Report,* corresponding U.K. Application No. 0521007.5, Dec. 23, 2005.

UK Patent Office, *Combined Search and Examination Report,* corresponding U.K. Application No. 0521009.1, Dec. 16, 2005.

German Patent Office, Office Action issued Jun. 2, 2006 for corresponding German application.

* cited by examiner

AUTOMOTIVE TRIM PART WITH APPLIQUE AND METHOD OF MAKING SAME

CROSS-REFERENCE

The present invention is related to U.S. Ser. No. 10/708,312, filed Feb. 24, 2004, U.S. Ser. No. 10/904,008, filed Oct. 19, 2004, U.S. Ser. No. 10/904,010, filed Oct. 19, 2004, U.S. Ser. No. 10/904,011, filed Oct. 19, 2004, U.S. Ser. No. 10/904,032, filed Oct. 20, 2004, U.S. Ser. No. 10/711,692, filed Sep. 30, 2004, U.S. Ser. No. 10/904,033, filed Oct. 20, 2004, U.S. Ser. No. 10/904,433, filed Nov. 10, 2004, U.S. Ser. No. 10/904,409, filed Nov. 9, 2004, U.S. Ser. No. 10/904,408, filed Nov. 9, 2004 and U.S. Ser. No. 10/904,407, filed Nov. 9, 2004.

FIELD OF THE INVENTION

BACKGROUND OF THE INVENTION

It is known to provide automotive interiors with various trim parts to enhance the aesthetic appearance of the automotive interior, and to provide comfort to vehicle occupants. Examples of some of these interior trim parts include instrument trim panels, door trim panels, console panels, armrests, bolsters, handles, trim plates, and airbag covers. To increase the aesthetic appearance of these trim parts and to improve the comfort to vehicle occupants, it is desired to provide at least portions of the trim parts, such as bolsters, with appliqués or decorative areas.

One primary drawback with current trim parts having decorative areas is in the manufacturing and assembly thereof. These trim parts, such as bolsters, typically, have been formed by insertion of a resilient padding material beneath a pliable surface or skin layer of decorative trim material, such as a textile or fabric like woven cloth, vinyl, and/or leather. The preformed resilient pad also may be secured to a rigid plastic shell and a pliable skin layer stretched over the pad and secured to the shell to form the decorative trim part. In other cases, padding is omitted to provide a rigid base and a decorative trim material that is adhesively bonded thereto. In another conventional method of forming trim parts with decorative areas for use in trim assemblies, a foam material may be injected between a rigid substrate and a decorative skin layer, already joined to the substrate. Consequently, the above noted methods are generally costly due to the multiple components and manufacturing steps required to make these decorative trim parts.

There is thus a need for an improved trim part with integrated appliqué for use in a trim assembly, and a method for making the same, that reduces the number of parts and the labor required for assembly thereof thereby reducing overall manufacturing costs.

SUMMARY OF THE INVENTION

The present invention provides for an improved trim part, such as a bolster, with an integrated appliqué for use in a trim assembly, e.g. a door trim panel assembly. It should be understood that the trim part may include any desired automotive trim part such as an instrument trim panel, door trim panel, console panel, armrest, handle, trim plate, airbag cover, etc., for use in any desired trim panel assembly, such as a door trim panel assembly, instrument panel assembly, console assembly, etc.

To this end, the trim part is an integrated, unitary structure that includes a substrate made from a first material, which may include a thermoplastic polymer such as a thermoplastic olefin, e.g. polypropylene, or polycarbonate/acrylonitrile butadiene styrene. A cover is integrally molded to at least a portion of the substrate and is composed of a second foamed material. The second foamed material may be a foamed thermoplastic polymer including a foamed thermoplastic elastomer or foamed polypropylene such as to provide a soft-feel. The foamed material generally produces a lightweight cover that includes an outer skin and a cellular inner core such that the outer skin deforms and compresses the inner core when a force is applied thereby providing a soft feel to the trim part. The second foamed material is activated, or foamed, by a blowing agent, such as sodium bicarbonate, nitrogen, or any other commonly known blowing agent.

An appliqué, or decorative cut-out, is provided, i.e. integrated, within a portion of the cover such that the cover is integrally molded to at least a portion of the appliqué to retain the appliqué. The appliqué creates a more aesthetically pleasing trim part, and includes a decorative material such as a textile or fabric like material including a woven cloth, vinyl, and/or leather, a plastic material, a metal piece, and the like. The appliqué further may be provided with a symbol(s) such as a letter(s), number(s), word(s), logo(s), picture(s), and the like.

The automotive trim part, e.g. a bolster, with integrated appliqué is formed in a continuous two-shot molding process. In this operation, a mold assembly is provided in which the substrate is formed by injecting the first material into a first shot mold cavity in a first shot of the molding operation. A core of the mold assembly is used, advantageously rotated, to move the substrate from the first shot mold cavity to a second shot mold cavity. The appliqué is provided within a portion of the second shot mold cavity then a mold chamber is formed about at least a portion of the substrate and the appliqué within the second shot mold cavity.

The cover then is integrally molded intermediate the substrate and appliqué by injecting into the mold chamber the second foamed material in a second shot of the molding operation, the cover being molded to at least a portion of the substrate and the appliqué to form the trim part with integrated appliqué. In addition, the foamed second material advantageously generally provides the trim part with a soft feel. In an exemplary method, the mold assembly for forming the trim part with appliqué includes first and second shot mold cavities and a rotatable core having first and second male portions adapted to mate with each cavity for forming a plurality thereof in a continuous manner.

By virtue of the foregoing, there is thus provided an improved trim part, such as a bolster, with an integrated appliqué, and a method of making the same, that reduces the number of parts and the labor required for assembly thereof thereby reducing overall manufacturing costs.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figures 1, 1A:
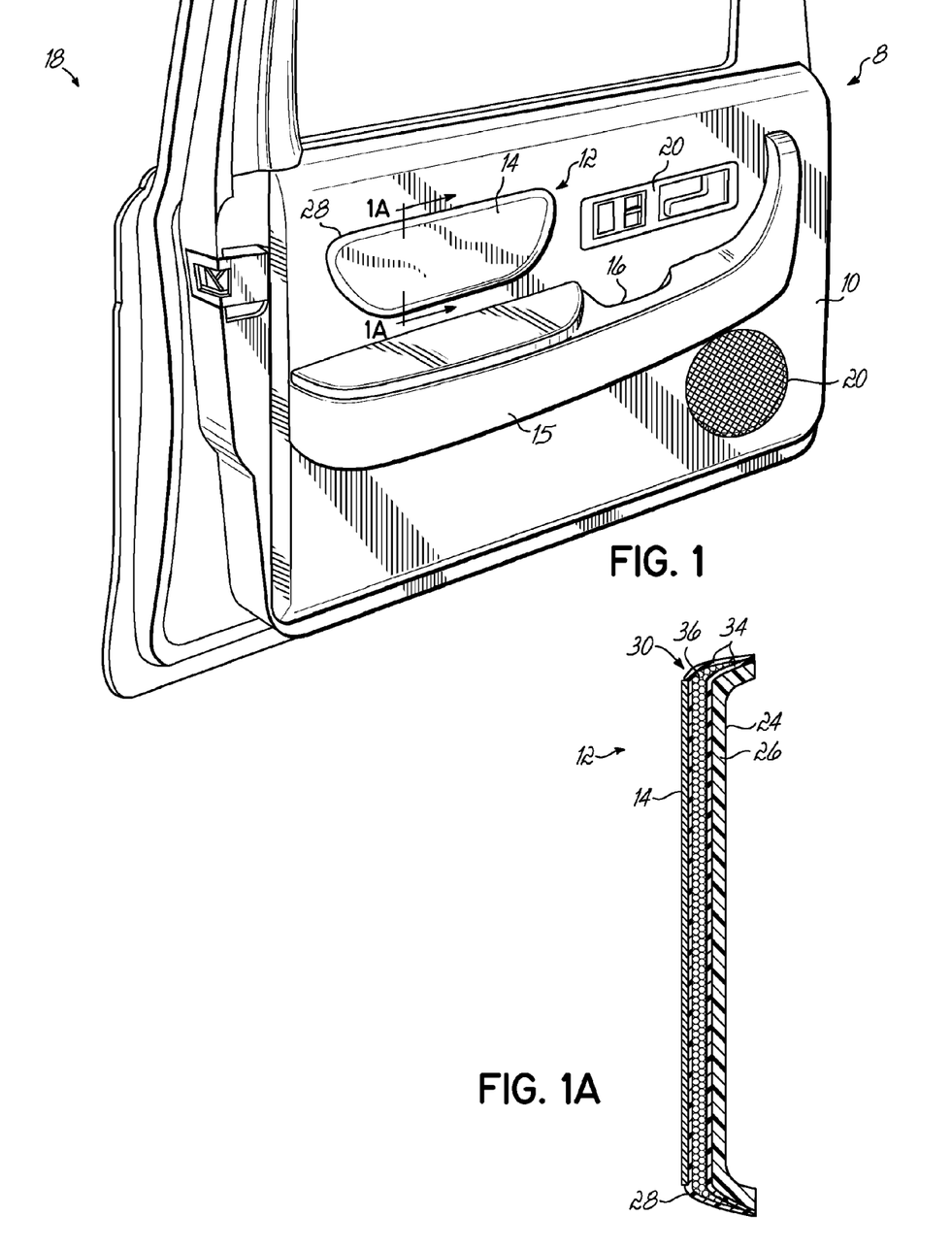
FIG. 1 is a perspective view of an automotive interior trim assembly including a trim part with appliqué according to the present invention.
FIG. 1A is a cross-sectional view of FIG. 1 taken along the lines 1A—1A.

In FIG. 1, an automotive interior trim assembly, i.e. a door trim panel assembly 8, for an automobile (not shown) includes an exemplary embodiment of the trim part, i.e. a bolster 12, with integrated appliqué 14. It should be understood that the trim part 12 with integrated appliqué 14 can include any desired automotive trim part, such as an instrument trim panel, door trim panel, console panel, armrest, handle, trim plate, airbag cover, etc., with each generally being constructed in a similar fashion. Thus, while the following detailed description focuses primarily on the bolster 12 with integrated appliqué 14, those having ordinary skill in the art will recognize that other trim parts having integrated appliqués may equally be considered for use in any desired trim assembly.

With continuing reference to FIG. 1, a door trim panel 10 of the trim panel assembly 8 covers a portion of the interior of the automobile (not shown) and includes the bolster 12 with integrated appliqué 14 to provide a more aesthetically pleasing environment. The door panel 10 further includes an armrest 15 with a handle portion 16 configured for grasping by a vehicle occupant to facilitate, for example, closing of a car door 18. A variety of openings, additionally, can be included in the trim panel 10 so as to accommodate the placement of hardware components 20 such as a speaker(s), door handle, window controls, etc.

As best shown in FIGS. 1 and 1A, the bolster 12 defines an integrated, unitary structure and includes a substrate 24 made from a first material 26. The first material 26 may include a thermoplastic polymer such as a thermoplastic olefin, e.g. polypropylene, or polycarbonate/acrylonitrile butadiene styrene. Notably, the thickness of the substrate advantageously is about 1–5 mm, more advantageously about 2–4 mm, most advantageously about 3 mm.

A cover 28 is integrally molded to at least a portion of the substrate 24 and is made from a second foamed material 30. It should be understood that the cover 28 may be provided over the entire substrate 24 or any portion thereof. The second foamed material 30 may be a foamed thermoplastic polymer including a foamed thermoplastic elastomer or foamed polypropylene such as to provide a soft-feel. The second foamed material 30 may be activated, or foamed, by a blowing agent, such as sodium bicarbonate and the like, any gas such as nitrogen, or any other commonly known blowing agent. More specifically, the blowing agent is combined, or mixed, with a thermoplastic polymer, such as a thermoplastic elastomer or polypropylene, advantageously a thermoplastic elastomer available from Kraiburg TPE, Corp. of Duluth, Ga., to produce the second foamed material 30. The blowing agent advantageously is present in an amount from 0.1% to 5% by weight of the mixture, more advantageously from 0.5% to 3% by weight.

The foamed material 30 produces the cover 28 which includes an outer skin 34 and a cellular inner core 36 such that the outer skin 34 deforms and compresses the inner core 36 when a force is applied thereby advantageously providing a soft feel to the trim part 12. Notably, the feel of the cover 28 may be varied, or adjusted, to any desired softness by changing the thickness thereof. At a thickness of about 1.5 mm or less, the cover 28 defines an outer skin 34 but is substantially devoid of a soft inner core 36 because of an inability of the core 36 to be foamed. As such, the thickness of the cover 28 advantageously is about 5–12 mm, more advantageously about 7–9 mm, and most advantageously about 8 mm.

An appliqué 14, or cut-out decoration, is provided, i.e. integrated, within a portion of the cover 28 such that the cover 28 is integrally molded to at least a portion of the appliqué 14 to retain the appliqué 14. The appliqué 14 includes a decorative material such as a textile or fabric like material including a woven cloth, vinyl, and/or leather, a plastic material, a metal piece, and the like, and creates a more aesthetically pleasing trim part 12 for the vehicle driver or occupant. The appliqué 14 further may be provided with a symbol(s) 38 (See FIG. 1B) such as a letter(s), number(s), word(s), logo(s), picture(s), and the like. The appliqué 14, as shown in FIG. 1, includes a woven cloth material.

Referring further to FIGS. 1 and 1A, the bolster 12 with integrated appliqué 14 is formed separately from the door trim panel 10 and secured thereto by means (not shown) commonly known in the art, such as by an adhesive, screws, clips, tacks, male portions, and the like. As such, the bolster 12 can be permanently secured or removably attached to the door trim panel 10 and may cover an access opening (not shown) defined therein such that when the bolster 12 is removed, a technician or assembly line worker can access the space behind the trim panel 10 to install or service door components and their drive mechanisms. In other cases, the trim part, i.e. the bolster 12, may be integrally molded to the door trim panel 10 and, more specifically, the substrate 24 and/or cover 28 of the bolster may be integrated, i.e. integrally molded, within the door panel 10 to provide an integrated bolster 12 with integrated appliqué 14.

Figure 1B:
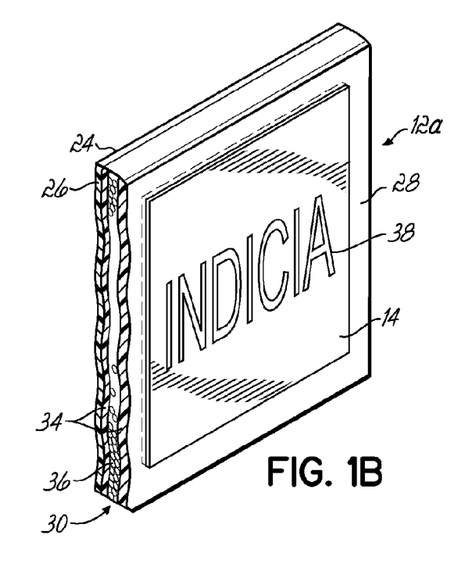
FIG. 1B is a perspective view with a partial cut-away section of an another embodiment of the automotive interior trim part with appliqué according to the present invention.

In another embodiment, as best shown in FIG. 1B, the trim part 12 generally may be a trim plate 12a with integrated appliqué 14. Accordingly, the trim plate 12a with integrated appliqué 14 similarly defines an integrated, unitary structure and includes the substrate 24 made from the first material 26, the integrally molded cover 28 made from the second foamed material 30, and the integrated appliqué 14, which is shown including a metal piece provided with a symbol 38 thereon. The trim plate 12a further is shown as having been formed separately by the methods further described below, and can be attached by means commonly known in the art, such as by an adhesive, to any desired trim part such as a bolster, armrest, airbag cover, door panel, console panel, etc., to provide a decorative look.

Figure 2:
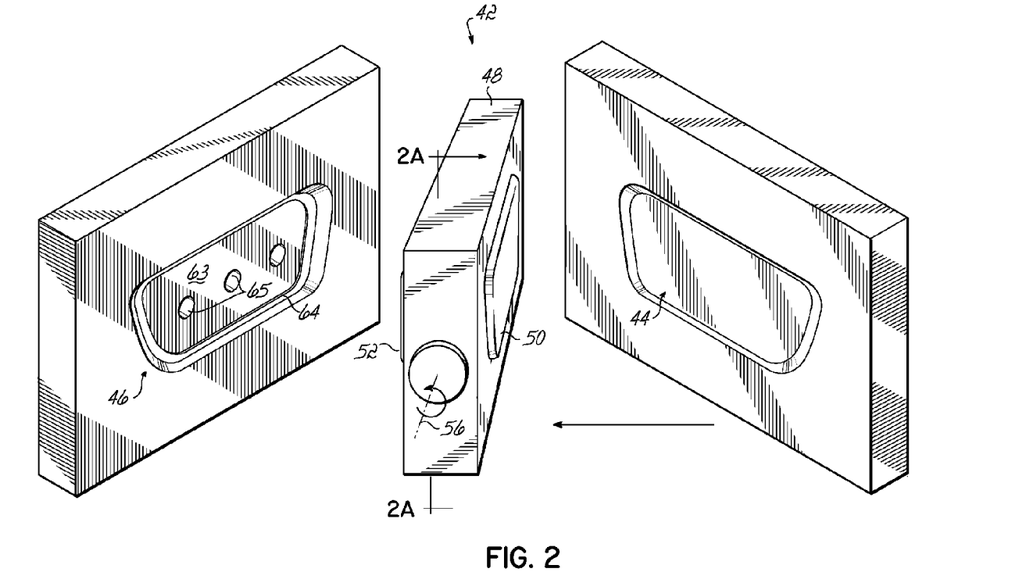
FIG. 2 is a perspective view of a mold assembly used to form the trim part with appliqué of FIG. 1.
Figure 2A:
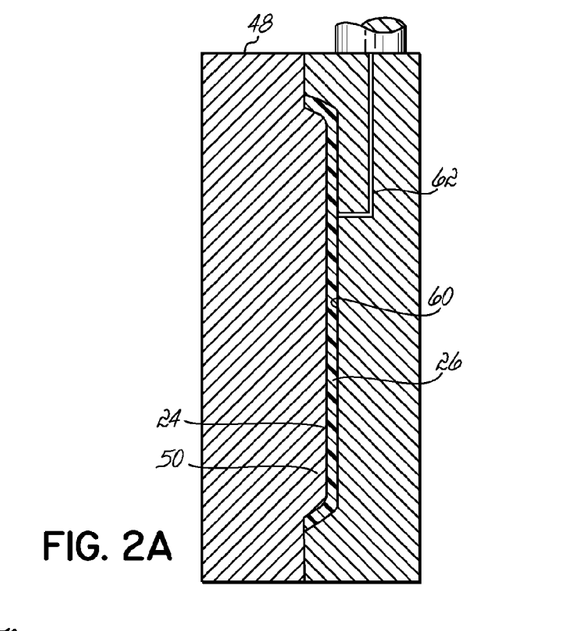
FIG. 2A is a cross-sectional view of the mold of FIG. 2 taken along the line 2A—2A illustrating the first shot of the molding operation of the trim part.
Figure 3:
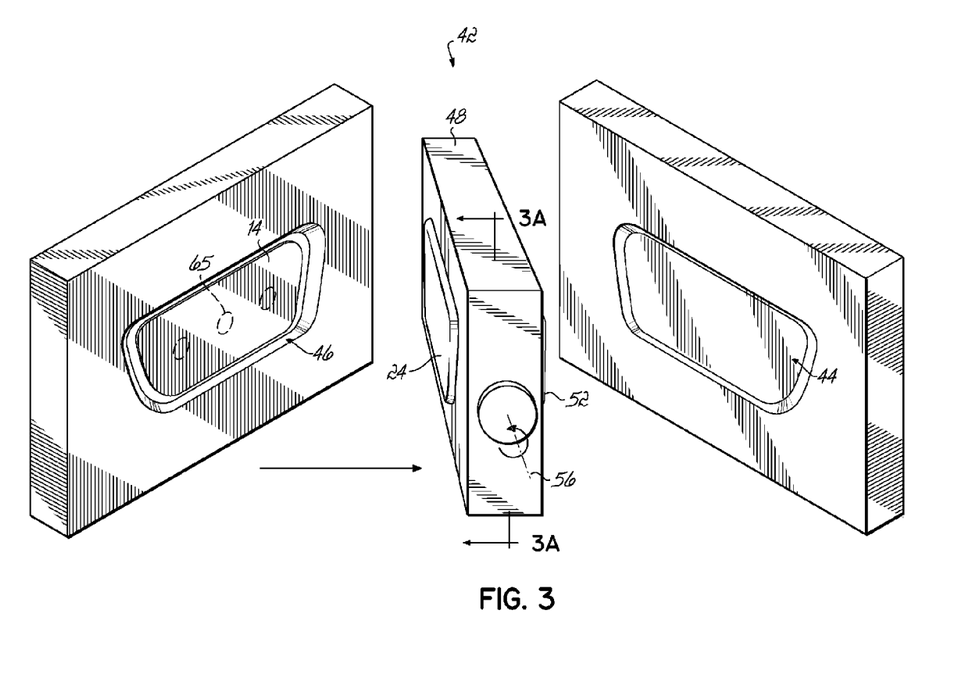
FIG. 3 is a perspective view of the mold assembly of FIG. 2 depicting the rotational movement from the first shot mold cavity to the second shot mold cavity of the formed substrate of FIG. 2A.
Figure 3A:
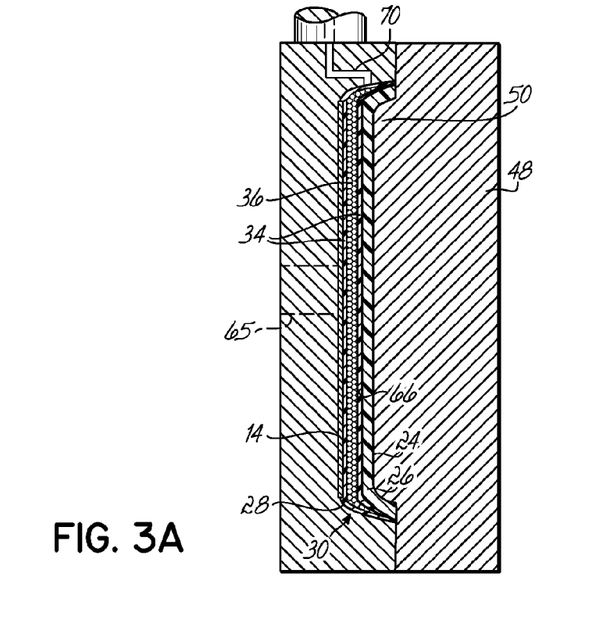
FIG. 3A is a cross-sectional view of the mold of FIG. 3 taken along the line 3A—3A illustrating the second shot of the molding operation of the trim part.

With reference to FIGS. 2–3A, a method of making the automotive trim part, i.e. the bolster 12, with appliqué 14 of the present invention will now be described. As best shown in FIG. 2, a single mold assembly 42 includes spaced apart first and second shot mold cavities 44 and 46 and a central core 48 having first and second male portions 50 and 52 adapted to mate with each cavity 44, 46. The core is 48 situated between the mold cavities 44, 46 and is adapted to rotate about a central axis, i.e. a horizontal axis 56, so that the first and second male portions 50, 52 can mate, in turn, with the mold cavities 44, 46 to mold, in sequence, first the substrate 24 then the cover 28 with integrated appliqué 14 in a continuous manner.

It should be understood by the artisan that variations of the mold assembly 42 may be provided and still fall within the scope of this invention. For example, any number of core male portions 50, 52 (i.e. more or less than shown) may be provided, in conjunction with the necessary number of corresponding first and second shot mold cavities 44, 46, for molding the trim part 12 with integrated appliqué 14.

While the first and second shots of the molding operation are further described below with respect to the first male portion 50 by utilizing the cross-sectional views of FIGS. 2 and 3, it is understood that the first and second shot molding process occurs in the same fashion with respect to the second male portion 52. Accordingly, as best shown in FIGS. 2 and 2A, the first male portion 50 of the core 48 mates with the first shot mold cavity 44 and, more specifically, the first shot mold cavity 44 is adapted to move toward the first male portion 50, as is commonly known in the art, to form a first shot chamber 60.

In a first shot of the molding operation, the first material 26, which may be a thermoplastic polymer such as a thermoplastic olefin, e.g. polypropylene, or polycarbonate/acrylonitrile butadiene styrene, is injected through a channel 62 into the chamber 60 to form the substrate 24 of the bolster 12. Specifically, the substrate 24 is molded over the first male portion 50 such that the first male portion 50 retains the molded substrate 24. Notably, the thickness of the substrate advantageously is about 1–5 mm, more advantageously about 2–4 mm, most advantageously about 3 mm.

With further reference to FIGS. 3 and 3A, the first shot mold cavity 44 is retracted, or moved away from, the first male portion 50, and the core 48 having the first male portion 50 provided with the substrate 24 then is rotated about the horizontal axis 56 to move the substrate 24 from the first shot mold cavity 44 to the second shot mold cavity 46. It should be understood that the core 48 also may rotate about a vertical axis or be adapted to move, or slide, sideways to the second shot mold cavity 46.

The second shot mold cavity 46 includes a placement area 63 (FIG. 2) adapted to receive and retain the appliqué 14 in anticipation of a second shot of the molding operation wherein the cover 28 for the trim part 12 is molded. Notably, the placement area 63 includes a recess that is defined by four walls 64 (FIG. 2) and further is configured to receive the appliqué 14. The walls 64 of the placement area 63 help retain the appliqué 14 therein. For certain appliqués 14, such as certain textile or fabric like materials including woven cloth, that lack the structural support to be retained within the placement area 63, one or more vacuum holes 65 can be provided therein. Accordingly, the vacuum holes 65 are connected to a vacuum (not shown), as is known in the art, for holding the appliqué 14 in place for the second shot of the molding operation.

The depth of the placement area 63 may be adjusted according to the thickness of the appliqué 14 and/or according to the desired depth of integration within the cover 28. In view thereof, the placement area 63 may be defined by an even, or a raised, surface (not shown). In addition, the placement area 63 may be defined by nibs (not shown), or ribs (not shown), configured and adapted to receive and retain the appliqué 14. It is further understood that various combinations of the aforementioned may be utilized for receiving and retaining the appliqué 14.

Accordingly, with further reference to FIGS. 3 and 3A, the appliqué 14 is placed within the placement area 63 (FIG. 2) by means (not shown) commonly known in the art, e.g. manually or robotically. Next, the first male portion 50 of the core 48 mates with the second shot mold cavity 46 and, more specifically, the second shot mold cavity 46 is adapted to move toward the first male portion 50, as is commonly known in the art, to form a second shot chamber 66 about at least a portion of the substrate 24 and the appliqué 14.

In the second shot of the molding operation, the second foamed material 30, which may be a foamed thermoplastic polymer such as a foamed thermoplastic elastomer or foamed polypropylene, is injected through a channel 70 into the second shot chamber 66 to form the cover 28. As best shown in FIG. 3A, the cover 28 is molded intermediate the substrate 24 and appliqué 14 so that the cover 28 integrally molds to at least the portion of the substrate 24 and the appliqué 14 to form the trim part 12 with integrated appliqué 14. As indicated above, the second foamed material 30 is activated, or foamed, by a blowing agent that can include sodium bicarbonate and the like, any gas such as nitrogen, or any other known blowing agent. More specifically, the blowing agent is combined, or pre-mixed, with a thermoplastic polymer, such as a thermoplastic elastomer or polypropylene, to form the second foamed material 30.

The foamed material 30 produces the cover 28, which advantageously includes an outer skin 34 and a cellular inner core 36 such that the outer skin 34 will deform and compress the inner core 36 when a force is applied thereby providing a soft feel. The feel of the cover 14 may be varied, or adjusted, to any desired softness by changing the thickness thereof, such as by altering the depth of the second shot chamber 66. At a thickness of about 1.5 mm and less, the cover defines an outer skin 34 but is substantially devoid of a soft inner core 36 because of an inability of the core 36 to be foamed. As such, the thickness of the cover advantageously is about 5–12 mm, more advantageously about 7–9 mm, and most advantageously about 8 mm.

After the second foamed material 30 has been allowed time sufficient to cure, the second shot mold cavity 46 is retracted, or moved away from, the first male portion 50, and the trim part, i.e. bolster 12, with integrated appliqué 14 is ejected from the first male portion 50, such as by ejector pins (not shown), so that the process may begin anew.

Although not illustrated, it is understood that the second male portion 52 also is adapted to mate with the first shot cavity 44, during the mating of the first male portion 50 with the second shot mold cavity 46, to form a second ssubstrate (not shown) that may be identical to the first substrate 24 by injecting the first material 26 into the first shot mold cavity 44 in the first shot of the molding operation. After injection, the core 48 with the second male portion 52 similarly rotates the second substrate to the second shot mold cavity 46 for the second shot of the molding operation while the first male portion 50 returns to the first shot mold cavity 44 to repeat the first shot of the molding operation. In this fashion, a plurality of automotive trim parts 12 with integrated appliqué 10 may be formed in a continuous and efficient manner.

With further reference to FIGS. 1 and 3A, the molded bolster 12 includes the substrate 24, the cover 28 integrally molded thereto, and the appliqué 14 integrated within the cover 28, i.e. the cover 28 integrally molded to the appliqué 14. The bolster 12 with integrated appliqué 14 now may be coupled, by means known in the art, to the door trim panel 10 for use in a trim assembly 8. Accordingly, the molding operation of the present invention may be continuously performed utilizing a single mold assembly 42 to provide an improved trim part, i.e. a bolster 12, with integrated appliqué 14.

Although, the method of making utilizes a single mold assembly 42 for a continuous, integrated process, it still should be understood that the molding process may be performed in more than one mold assembly such that the substrate 24 may be moved from the first shot mold cavity 44 after the first shot to a second shot mold cavity 46 provided in a second, separate mold assembly (not shown) for the second shot of the molding operation. Movement can be manually or by other means commonly known in the art, e.g. robotically.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An automotive interior trim part, comprising:
   a substrate made from a first material;
   an appliqué defined by a preformed decorative member; and
   a cover made from a second foamed material, the cover being situated intermediate the appliqué and substrate and further being integrally molded to at least a portion of the substrate and to at least a portion of the appliqué to form an integrated, unitary trim part, the cover partially visible when viewed from a front side of the integrally molded appliqué.

2. The automotive interior trim part of claim 1, wherein the first material includes a thermoplastic polymer and the second foamed material includes a foamed thermoplastic polymer.

3. The automotive interior trim part of claim 2, wherein the foamed thermoplastic polymer includes one of a foamed thermoplastic elastomer and foamed polypropylene.

4. The automotive interior trim part of claim 1, wherein the integrated unitary trim part is one of a trim plate and bolster.

5. The automotive interior trim part of claim 1, wherein the appliqué is provided with a symbol.

* * * * *

UNITED STATES PATENT AND TRADEMARK OFFICE
CERTIFICATE OF CORRECTION

PATENT NO. : 7,156,437 B2 Page 1 of 1
APPLICATION NO. : 10/904007
DATED : January 2, 2007
INVENTOR(S) : Glenn A. Cowelchuk It is certified that error appears in the above-identified patent and that said Letters Patent is hereby corrected as shown below:

On the title page item (56), page 2, col. 1, line 46, change "6,214,157 B1 4/2001 Sjpengler" to --6,214,157 B1 4/2001 Spengler--.

In Column 3, line 5, change "along the lines 1A-1A;" to --along the line 1A-1A;--.

In Column 4, line 30, change "with a symbol(s) 38(See FIG. 1B) such as" to --with a symbol(s) 38(see FIG. 1B) such as --.

In Column 5, line 3, change "The core is 48 adapted to mate with" to --The core 48 is adapted to made with --.

In Column 7, line 27, change "spirit of Applicant's general" to --spirit of Applicant's general --.

Signed and Sealed this

Fifteenth Day of May, 2007

JON W. DUDAS
*Director of the United States Patent and Trademark Office*